US010386993B2

(12) United States Patent
Matejka et al.

(10) Patent No.: US 10,386,993 B2
(45) Date of Patent: Aug. 20, 2019

(54) TECHNIQUE FOR SEARCHING AND VIEWING VIDEO MATERIAL

(71) Applicant: AUTODESK, INC., San Rafael, CA (US)

(72) Inventors: Justin Frank Matejka, Newmarket (CA); George Fitzmaurice, Toronto (CA); Tovi Grossman, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 352 days.

(21) Appl. No.: 14/524,770

(22) Filed: Oct. 27, 2014

(65) Prior Publication Data
US 2015/0153919 A1 Jun. 4, 2015

Related U.S. Application Data

(60) Provisional application No. 61/911,301, filed on Dec. 3, 2013.

(51) Int. Cl.
*G06F 3/0482* (2013.01)
*G06F 16/93* (2019.01)
(Continued)

(52) U.S. Cl.
CPC .......... *G06F 3/0482* (2013.01); *G06F 16/743* (2019.01); *G06F 16/93* (2019.01);
(Continued)

(58) Field of Classification Search
CPC ......... G06F 17/30843; G06F 17/30852; G06F 17/30825; G06F 17/30849; G06F 3/0484;
(Continued)

(56) References Cited

U.S. PATENT DOCUMENTS

2006/0120624 A1* 6/2006 Jojic ................. G06F 17/30843
382/284
2008/0184120 A1* 7/2008 OBrien-Strain ..........................
G06F 17/30843
715/723
(Continued)

OTHER PUBLICATIONS

Alexander, et al., "Revisiting Read Wear: Analysis, Design, and Evaluation of a Footprints Scrollbar", CHI Apr. 8, 2009, Desktop Techniques, pp. 1665-1674.
(Continued)

*Primary Examiner* — Ajay M Bhatia
*Assistant Examiner* — Mong-Shune Chung
(74) *Attorney, Agent, or Firm* — Artegis Law Group, LLP

(57) ABSTRACT

A video processing engine is configured to generate a graphical user interface (GUI) that allows an end-user of the video processing engine to select a specific video and search through the specific video to detect a desired target scene. The video processing engine provides a grid array of video thumbnails that are configured to each display a segment of the video so that multiple scenes may be visually scanned simultaneously. When the end-user identifies a scene within a video thumbnail that may be the desired target scene, the end-user may launch the content of the video thumbnail in full-screen mode to verify that the scene is in fact the desired target scene. An advantage of the approach described herein is that the video processing engine provides a sampled overview of the video in its entirety, thus enabling the end-user to more effectively scrub the video for the desired target scene.

16 Claims, 8 Drawing Sheets

(51) Int. Cl.
    G06F 17/50      (2006.01)
    H04L 12/24      (2006.01)
    H04N 21/00      (2011.01)
    H04N 21/4728    (2011.01)
    H04N 21/482     (2011.01)
    G11B 27/10      (2006.01)
    G11B 27/34      (2006.01)
    G06F 16/74      (2019.01)
(52) U.S. Cl.
    CPC .......... G06F 17/509 (2013.01); G11B 27/102
        (2013.01); G11B 27/34 (2013.01); H04L 41/22
            (2013.01); H04N 21/00 (2013.01); H04N
        21/4728 (2013.01); H04N 21/482 (2013.01);
                           H04N 21/4821 (2013.01)
(58) Field of Classification Search
    CPC ................. G06F 3/0482; G06F 17/509; G06F
                17/30011; H04N 1/00453; H04N
                21/4821; H04N 21/482; H04N 21/4728;
                H04N 21/00; H04L 41/22; G11B 27/10
    See application file for complete search history.

(56)            References Cited

U.S. PATENT DOCUMENTS

2010/0088646 A1*  4/2010  Nishimori .............. H04N 19/61
                                                    715/838
2011/0197131 A1*  8/2011  Duffin ................... G11B 27/105
                                                    715/720
2013/0307792 A1* 11/2013  Andres ................. G11B 27/005
                                                    345/173

OTHER PUBLICATIONS

André, et al., "Discovery Is Never by Chance: Designing for (Un)Serendipity", Creativity and Cognition, Oct. 26-30, 2009, 10 pages.
Aris, et al., "Visual Overviews for Discovering Key Papers and Influences Across Research Fronts", Journal of the American Society for Information Science and Technology, 60(11), 2009, pp. 2219-2228.
Bailer, et al., "Video Content Browsing Based on Iterative Feature Clustering for Rushes Exploration", TRECVID Workshop, May 2011, pp. 230-239.
Barnes, et al., "Video Tapestries with Continuous Temporal Zoom", ACM SIGGRAPH. Article 89, Jul. 2010, 9 pages.
Bederson, "Interfaces for Staying in the Flow", Ubiquity, Sep. 2004, 8 pages.
Bederson, et al., "Pad++: A Zooming Graphical Interface for Exploring Alternate Interface Physics", UIST, Jan. 1994, 10 pages.
Brandt, et al., "Example-Centric Programming: Integrating Web Search into the Development Environment", CHI 2010 End-User Programming I, Apr. 10-15, 2010, pp. 513-522.
Byrd, "A Scrollbar-based Visualization for Document Navigation", Proceedings of the Fourth ACM Conference on Digital Libraries, 1999, 8 pages.
Cao, et al., "FacetAtlas: Multifaceted Visualization for Rich Text Corpora", IEEE Transactions on Visualization and Computer Graphics, 16(6), 2010, pp. 1172-1181.
Card, et al., "The WebBook and the Web Forager: An Information Workspace for the World-Wide Web", Human factors in computing systems, 1996, 11 pages.
Divakaran, et al., "Augmenting Fast-Forward and Rewind for Personal Digital Video Recorders", IEEE ICCE, 2005, 5 pages.
Dunne, et al., "GraphTrail: Analyzing Large Multivariate, Heterogeneous Networks while Supporting Exploration History", CHI May 5-10, 2012, 10 pages.
Dunne, et al., "Rapid Understanding of Scientific Paper Collections: Integrating Statistics, Text Analytics, and Visualization", Computational Linguistics, 2011, 31 pages.
Giles, et al., "CiteSeer: An Automatic Citation Indexing System", Third ACM Conference on Digital Libraries, 1998, pp. 89-98.
Girgensohn, et al., "DocuBrowse: Faceted Searching, Browsing, and Recommendations in an Enterprise Context", Feb. 7-10, 2010, 10 pages.
Gove, et al., "Evaluating Visual and Statistical Exploration of Scientific Literature Networks", IEEE VLHCC, 2011, 8 pages.
Gray, et al., "Milliseconds Matter: An Introduction to Microstrategies and to Their Use in Describing and Predicting Interactive Behavior", Journal of Experimental Psych., 6(4), 2000, pp. 322-335.
Grossman, et al., "Chronicle: Capture, Exploration, and Playback of Document Workflow Histories", UIST, Oct. 3-6, 2010, pp. 143-152.
Hearst, "UIs for Faceted Navigation Recent Advances and Remaining Open Problems", Interfaces, 2008, 5 pages.
Hong, et al., "Turning Pages of 3D Electronic Books", IEEE Symposium on 3D User Interfaces, Mar. 25-26, 2006, pp. 159-165.
Howland, et al., "How Scholarly Is Google Scholar? A Comparison to Library Databases", College & Research Libraries, 70(3), 2009, pp. 227-234.
Hürst, "Interactive Audio-Visual Video Browsing", ACM MM, Oct. 23-27, 2006, 4 pages.
Hürst, et al., "Quantity versus Quality—The Role of Layout and Interaction Complexity in Thumbnail-based Video Retrieval Interfaces", ICMR, Jun. 5-8, 2012, 8 pages.
Jackson, et al., "Panopticon: A Parallel Video Overview System", ACM UIST, Oct. 8-11, 2013, pp. 8.
Janin, et al., "Joke-o-mat HD: Browsing Sitcoms with Human Derived Transcripts", ACM Multimedia, 2010, 3 pages.
Jeng, "What Is Usability in the Context of the Digital Library and How Can It Be Measured?" Information Technology and Libraries, 24(2), Jun. 2005, pp. 47-56.
Lee, et al., FacetLens: Exposing Trends and Relationships to Support Sensemaking within Faceted Datasets, CHI, Apr. 4-9, 2009, 10 pages.
Lee, et al., "Understanding Research Trends in Conferences using PaperLens", CHI Apr. 2-7, 2005, pp. 1969-1972.
Matejka, et al., "Citeology: Visualizing Paper Genealogy", CHI Extended Abstracts, May 5-10, 2012, 9 pages.
Matejka, et al., "Swift: Reducing the Effects of Latency in Online Video Scrubbing", ACM CHI, May 5-10, 2012, 10 pages.
Matejka, et al., "Swifter: Improved Online Video Scrubbing", ACM CHI, Apr. 27-May 2, 2013, pp. 1159-1168.
Nel, "Large Image Support in Digital Repositories", Master of Philosophy, Department of Computer Science, University of Cape Town, Jan. 2010, 92 pages.
Pietriga, "A Toolkit for Addressing HCI issues in Visual Language Environments", VLHCC Oct. 2005, 9 pages.
Pirolli, "Information Foraging in Information Access Environments", Creativity, Jan. 1995, 10 pages.
Plaisant, "The Challenge of Information Visualization Evaluation", AVI, 11(4), 2004, 8 pages.
Pongnumkul, "Content-Aware Dynamic Timeline for Video Browsing", ACM UIST, Oct. 3-6, 2010, pp. 139-142.
Ramos, et al., "Fluid Interaction Techniques for the Control and Annotation of Digital Video", ACM UIST, 2003, pp. 105-114.
Rooke, et al., "AppMap: Exploring User Interface Visualizations", Graphics Interface 2011, pp. 111-118.
Schoeffmann, et al., "The Video Explorer—A Tool for Navigation and Searching within a Single Video based on Fast Content Analysis", ACM SIGMM, Feb. 22-23, 2010, 12 pages.
Strobelt, et al., "Document Cards: A Top Trumps Visualization for Documents", InfoVis, Jul. 27, 2009, 8 pages.
Teevan, et al., "Visual Snippets: Summarizing Web Pages for Search and Revisitation", CHI, 2009, 11 pages.
Truong, et al., "Video Abstraction: A Systematic Review and Classification" ACM Transactions on Multimedia Computing Communications and Applications, vol. 3, No. 1, Article 3, Feb. 2007, 37 pages.

(56) References Cited

OTHER PUBLICATIONS

Tse, et al., "Dynamic Key Frame Presentation Techniques for Augmenting Video Browsing", ACM AVI, 1998, pp. 185-194.
Wexelblat, et al., "Footprints: History-Rich Tools for Information Foraging", CHI, 1999, 8 pages.
Woodruff, et al., "Using Thumbnails to Search the Web", SIGCHI Mar. 31-Apr. 4, 2001, 8 pages.

* cited by examiner

TECHNIQUE FOR SEARCHING AND VIEWING VIDEO MATERIAL

CROSS-REFERENCE TO RELATED APPLICATIONS

This application claims the benefit of U.S. provisional patent application titled "Techniques for Viewing and Searching Different Types of Content," filed on Dec. 3, 2013 and having Ser. No. 61/911,301. The subject matter of this related application is hereby incorporated herein by reference.

BACKGROUND OF THE INVENTION

Field of the Invention

The present invention generally relates to computer graphics and, more specifically, to a technique for searching and viewing video material.

Description of the Related Art

Videos of movies and television shows are made up of multiple scenes. Often a viewer may want to watch a specific scene that occurs in the video. Current approaches to searching for a particular scene in a computer-based video player can be problematic. Locating a target scene can be difficult because the viewer may not know where the scene is located chronologically in the video. Considerable time and effort may be expended in searching through a video.

To locate a specific scene, a viewer may simply play the video from the beginning and identify the scene whenever it occurs. This may be a time consuming approach, particularly when the target scene occurs late in the video. Alternatively the viewer may manipulate a timeline control, often available in video players, to search through the video. Other, more refined approaches provide a single thumbnail that displays a single still scene of the video and may be updated continuously with a timeline slider control. Typically, during the search operation, referred to as scrubbing, network latency prevents a video player from updating the displayed frame until the seeking operation has ended, that is, until the slider stops moving. This approach can work well if the user knows an exact timestamp of the portion of video to be reviewed. In the absence of this knowledge, however, the process becomes haphazard. Further, as only a single frame is visible at one time, large portions of the video may be missed due to insufficient resolution provided by the timeline control. In addition, the video must still be viewed sequentially, and the user may expend considerable effort to find the required content.

As the foregoing illustrates, what is needed in the art is a more effective way to search for and view a target scene in video-oriented material.

SUMMARY OF THE INVENTION

One embodiment of the invention includes a computer-implemented method for identifying a target scene within a video file including obtaining a first set of frames that reflect a first portion of the video file, obtaining a second set of frames that reflect a second portion of the video file, generating a graphical user interface (GUI) that displays a timeline control, causing the GUI to display a first frame included in the first set of frames and a first frame included in the second set of frames when the timeline control resides at a first position, and causing the GUI to display a second frame included in the first set of frames and a second frame included in the second set of frames when the timeline control resides at a second position.

One advantage of the disclosed technique is that the configurable interactive grid enables the user to rapidly locate a target scene within a video of unspecified length by scrubbing multiple video thumbnails simultaneously.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
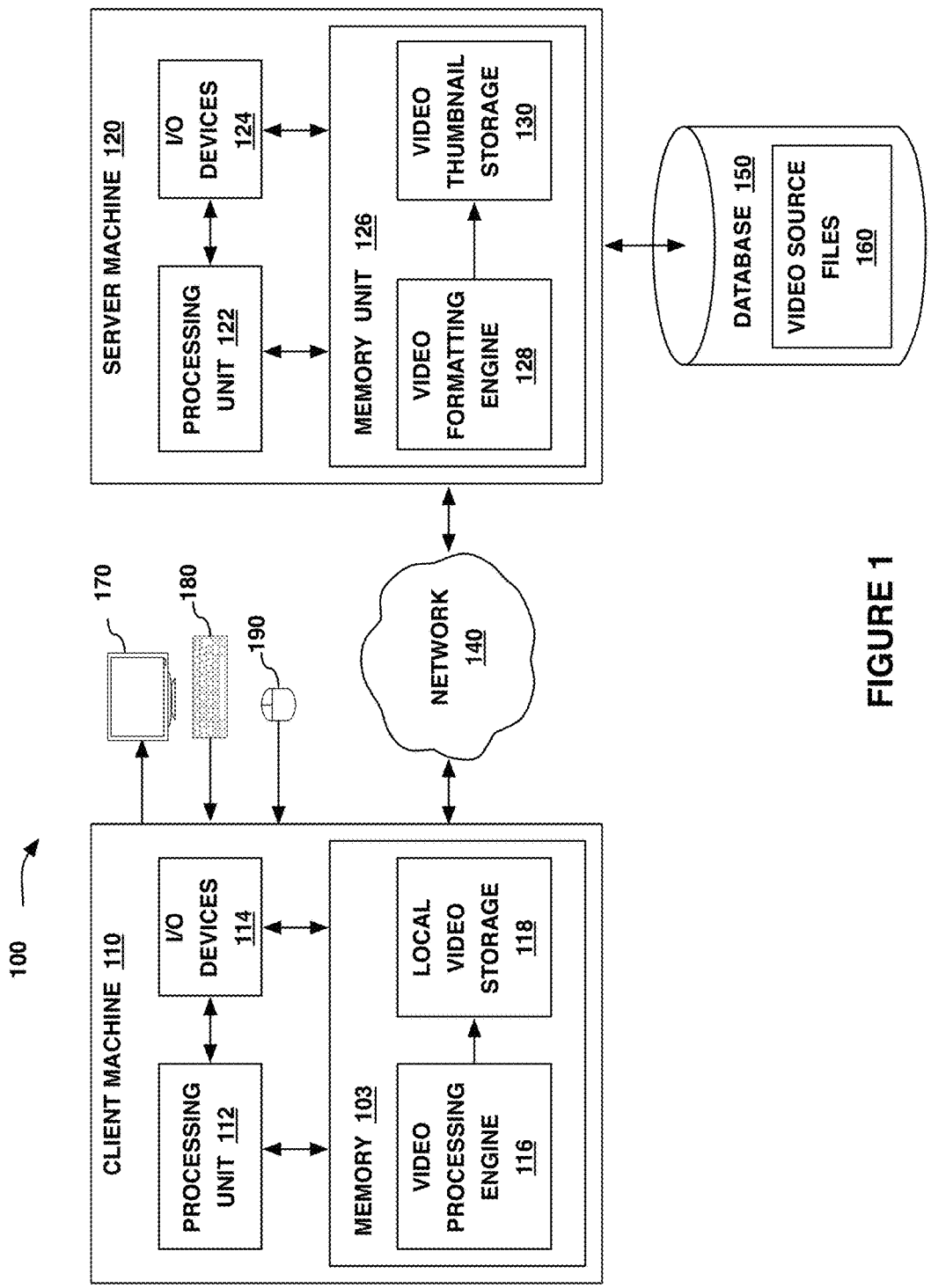
FIG. 1 illustrates a system configured to implement one or more aspects of the present invention.

FIG. 1 illustrates a system 100 configured to implement one or more aspects of the present invention. As shown, the system includes client machine 110 coupled to server machine 120 by network 140. Server machine 120 is also coupled to database 150. Client machine 110 represents a client computing device configured to interact with server machine 120 in order to produce video content that enables rapid searching of the video content to locate user specified target scenes.

Client machine 110 includes processing unit 112 coupled to input/output (I/O) devices 114 and to memory 103. Processing unit 112 may be a central processing unit (CPU), a graphics processing unit (GPU), or a combination of different processing units, such as a CPU configured to operate in conjunction with a GPU. In general, processing unit 112 may be any technically feasible hardware unit capable of processing data and/or executing software applications. I/O devices 114 are also coupled to memory 103 and may include devices capable of receiving input, devices capable of producing output, as well as devices capable communicating via network 140. Client machine 110 is further coupled to display device 170, keyboard 180, and mouse 190, which afford the end-user access to client machine 110. Memory 103 further includes video processing engine 116 and local video storage 118.

Server machine 120 is a computing device that may reside within a data center remote from client machine 110. Server machine 120 includes processing unit 122 coupled to I/O devices 124 and to memory unit 126. Processing unit 122 may be a central processing unit (CPU), a graphics processing unit (GPU), or a combination of different processing units, such as a CPU configured to operate in conjunction with a GPU. I/O devices 124 are also coupled to memory unit 126 and may include devices capable of receiving input such as a keyboard, mouse, or other input elements, devices capable of producing output such as a monitor or printer, as well as elements that enable communication via network 140. Memory 126 further includes video formatting engine 128 and video thumbnail storage 130. Server machine 120 is also coupled to database 150, which includes video source files 160. Video source files 160 may be a collection of movies, television content, personal video content, or any other types of video files.

In one embodiment, server machine 120 sequentially transmits video data in a frame-by-frame fashion, termed streaming. In the streaming mode, client machine 110 initiates a request to server machine 120 to invoke a specific video from among video source files 160.

Video formatting engine 128, when invoked by processing unit 112, accesses the specific video within video source files 160 and modifies and reworks the content of the specific video into a complement of thumbnail video segments, where each thumbnail video segment is a unique subset of the specific video. Video formatting engine 128 then arranges the complement of thumbnails into a grid array and stores the grid array of thumbnail video segments in video thumbnail storage 130 in order to be available for streaming to client machine 110.

Video formatting engine 128 then streams the specific video to client machine 110 via network 140. If the target scene is not immediately evident upon displaying the specific video, the user may then invoke the thumbnail grid view, as described below in conjunction with FIG. 3. Video formatting engine 128 then streams the thumbnail grid view to client machine 110. Video processing engine 116 processes the data provided by video formatting engine 128, creates viewable data structures, and displays the grid of thumbnail video segments via display device 170 or other elements included in I/O devices 114. Each thumbnail within the grid of thumbnails then displays active video of each unique video segment of the selected video.

The user may then examine the static thumbnail grid to identify a target scene. If the target scene is not evident in the grid of thumbnails, the user may manipulate a timeline control, as described below in conjunction with FIG. 3, to scrub all thumbnails simultaneously. When the target scene is identified in a particular thumbnail, the user may select the particular thumbnail to view the scene in full-screen mode.

In another embodiment, the client machine operates in a stand-alone mode with no server interaction. In the stand-alone mode, a video file is stored locally in local video storage 118. Video processing engine 116 modifies and reworks the content of the video file into a complement of thumbnail video segments, where each thumbnail video segment is a unique subset of the selected video. Video processing engine 116 then arranges the thumbnail video segments into a grid array and stores the grid array of thumbnail video segments in local video storage 118.

Video processing engine 116 then displays the selected video via display device 170 or other elements included in I/O devices 114. If the target scene is not immediately evident upon displaying the video that the end-user specifies from among video source files 160, the user may then invoke the thumbnail grid view. Video processing engine 116 then displays the thumbnail grid view via display device 170 or other elements included in I/O devices 114. As described above, the user may then examine the static thumbnail grid, and, if the target scene is not evident in the grid of thumbnails, manipulate the timeline control to scan all thumbnails simultaneously. When the target scene is identified in a particular thumbnail, the user may select that thumbnail to view the scene in full screen mode.

Exemplary Screenshots Illustrating a Technique for Scrubbing

Figure 2:
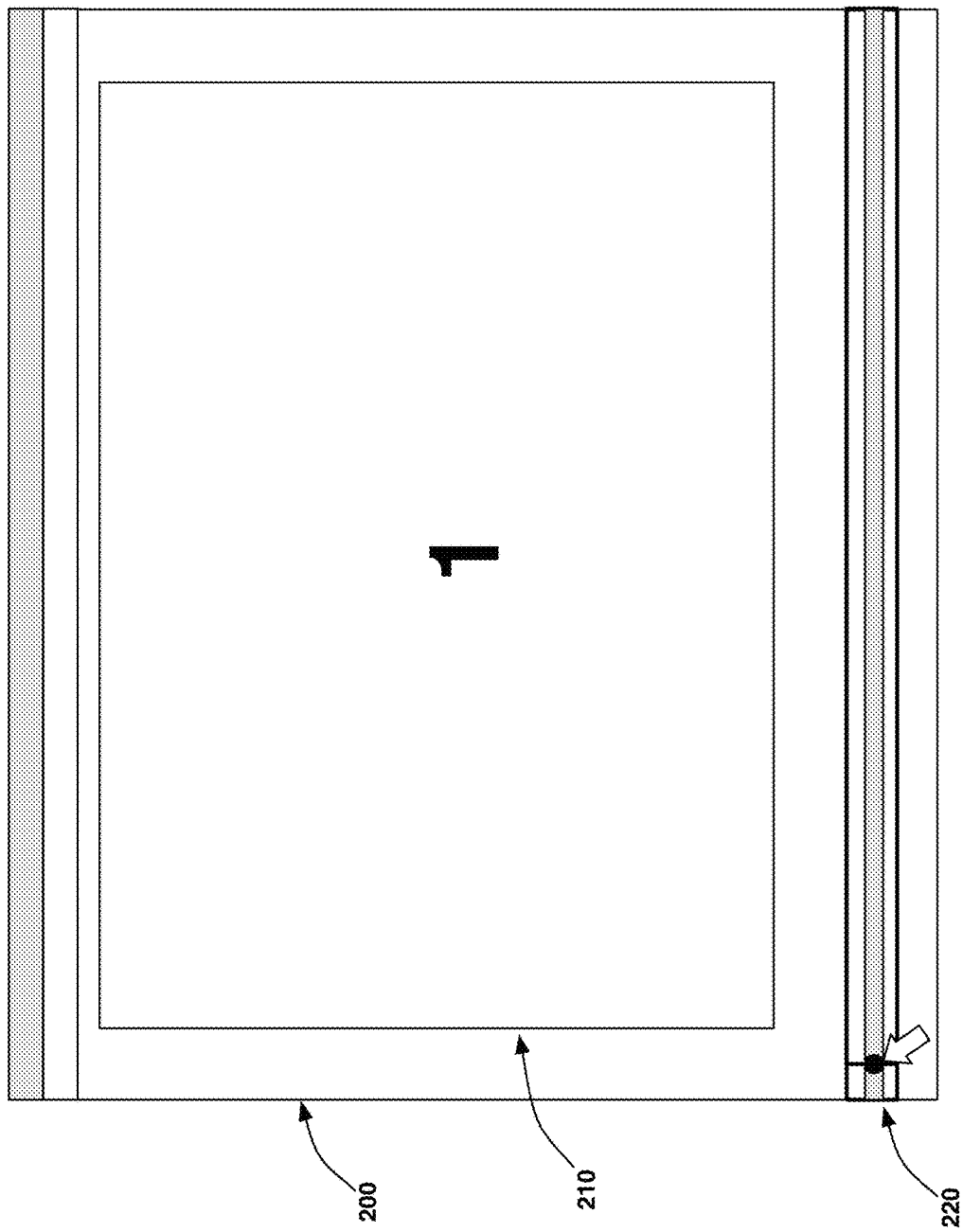
FIG. 2 is a screenshot depicting the first frame of a video, according to one embodiment of the present invention.

FIG. 2 is a screenshot 200 depicting the first frame of a video, according to one embodiment of the present invention. Screenshot 200 may be captured from display device 170. As shown, screenshot 200 includes a video display area 210, depicted as displaying the first frame of a video in full screen mode. Screenshot 200 further includes a timeline control 220, depicted as a conventional slider control. Timeline control 220 affords scanning through a video by moving the slider, where the slider in the left-most position, as shown, queues the first frame of the video, and moving further to the right queues frames successively further towards the chronological end of the video. The action of scanning, or synonymously, scrubbing, through a video is a chronological movement through the frames of the video in response to the changing position of the timeline control. Scenes, or component frames within scenes, may be identified by their relative chronology within the totality of the video.

Figure 3:
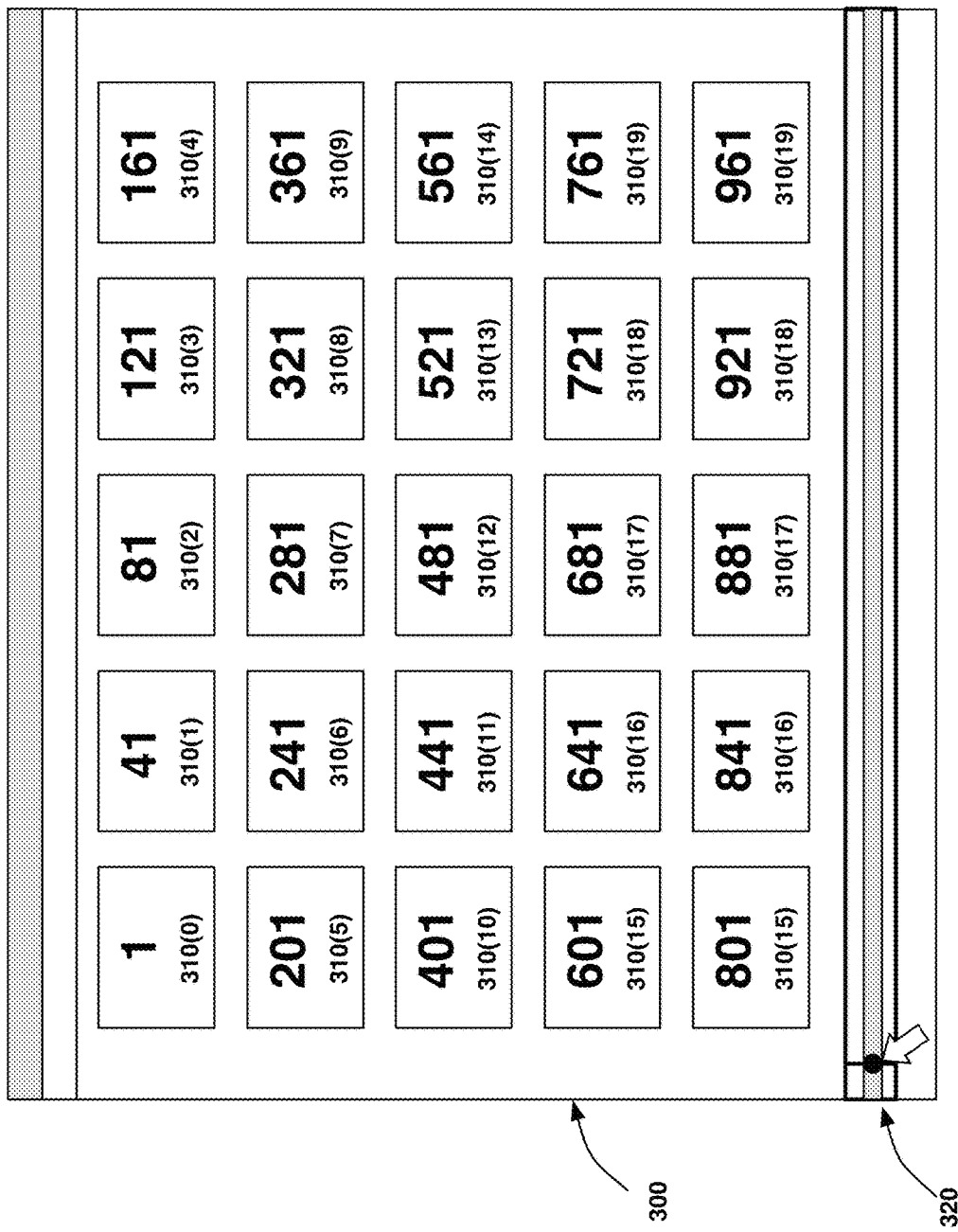
FIG. 3 is a screenshot depicting a grid of video thumbnails, according to one embodiment of the present invention.
Figure 4:
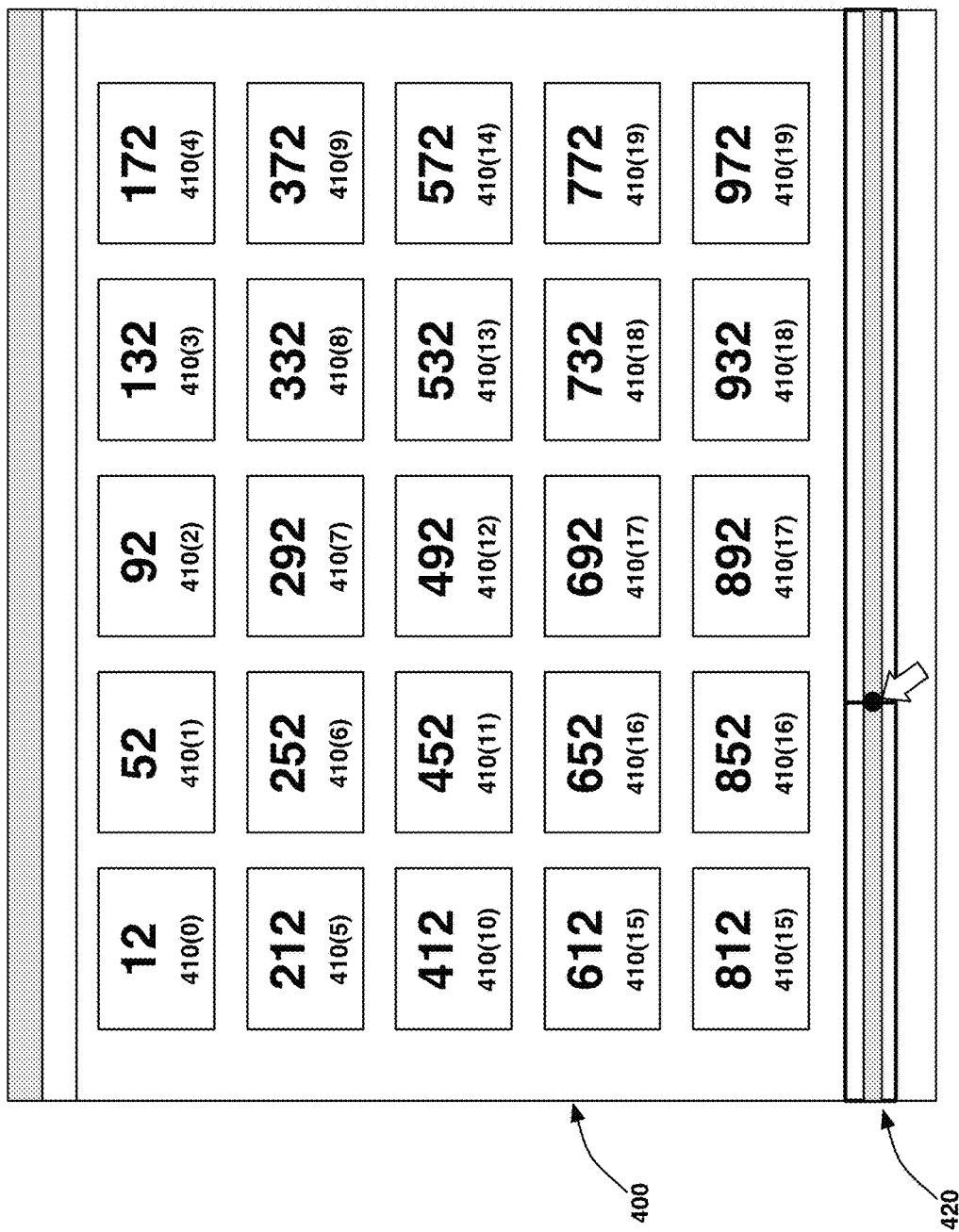
FIG. 4 is a screenshot depicting a grid of video thumbnails scanned to subsequent frames by operation of a timeline control, according to one embodiment of the present invention.
Figure 5:
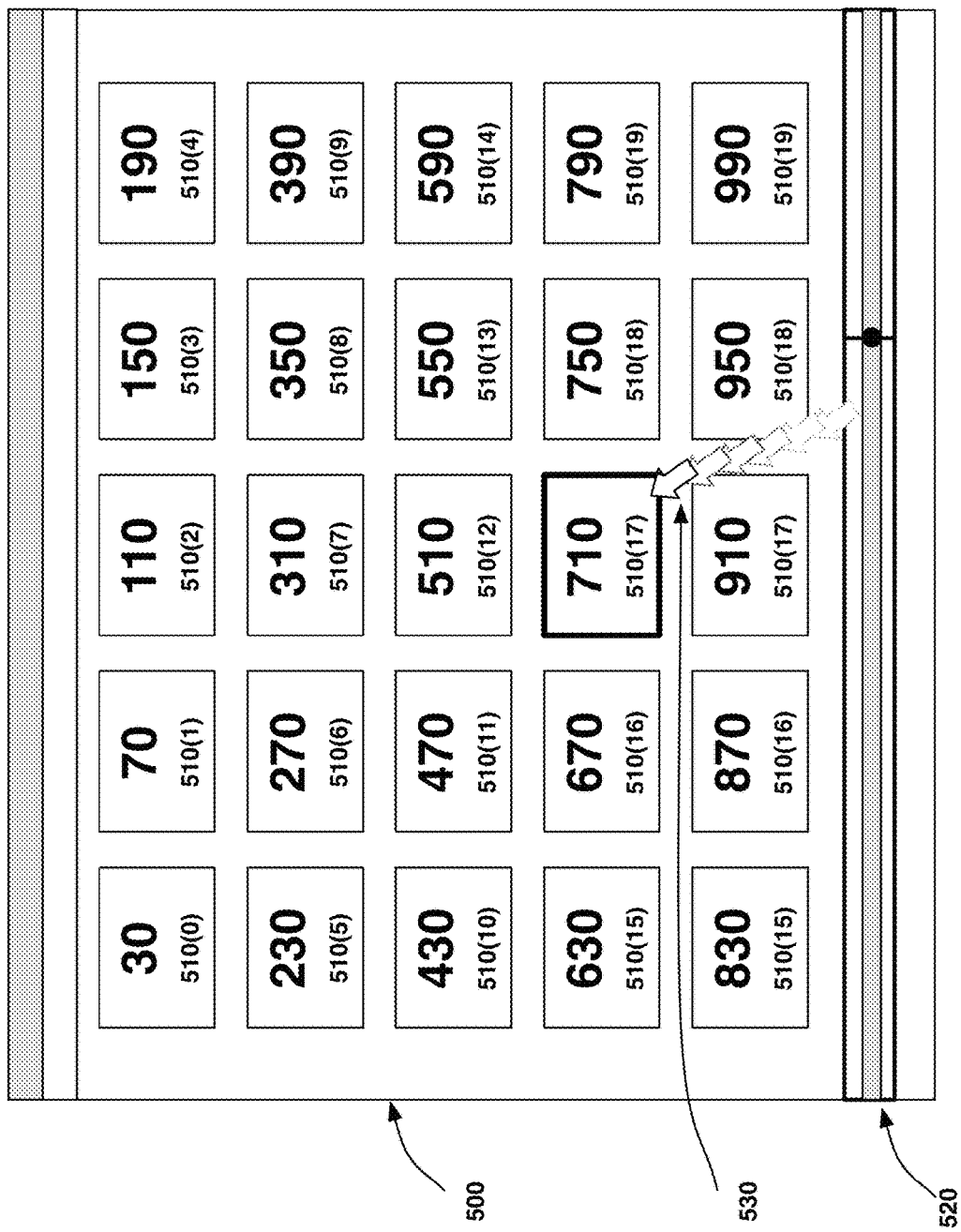
FIG. 5 is a screenshot depicting the selection of a target scene in a grid of video thumbnails scanned to subsequent frames, according to one embodiment of the present invention.

FIGS. 3 through 5 illustrate the search activity by depicting a progression of screenshots. The screenshots proceed from the beginning of the video, illustrated in FIG. 3, to an intermediate point, illustrated in FIG. 4, to a final point, illustrated in FIG. 5, at which a scene is identified and a final selection is made.

FIG. 3 is a screenshot 300 depicting a grid of video thumbnails, according to one embodiment of the present invention. Screenshot 300 may be captured from display device 170. Screenshot 300 includes a grid of video thumbnail segments 310(0) through 310(19). Although screenshot 300 depicts a five-by-five grid, persons skilled in the art will understand that a grid of any dimension or symmetry is within the scope of the present invention. The dimension or symmetry of the grid of static video thumbnails may be selected based on the size, resolution, and aspect ratio of display device 170 or other elements included in I/O devices 114, The grid of video thumbnail segments 310 illustrates an example of a video that includes one thousand frames divided into twenty-five equal segments of forty frames each. Video thumbnail segment 310(0) depicts the display of frame one, which is the first frame of the first segment, where the first segment includes frames one through forty. Video thumbnail segment 310(1) depicts the display of frame forty-one, which is the first frame of the second segment, where the second segment includes frames forty-one through eighty. Successive video thumbnail segments follow displaying successive groups of frames until video thumbnail segment 310(19) depicts frame nine hundred sixty one, which is the first frame of the twenty-fifth and final segment, where the final segment includes frames nine hundred sixty one through one thousand.

Screenshot 300 further includes a timeline control 320. Timeline control 320 is shown in the left-most position so that each thumbnail segment displays the first frame of each unique segment of the video. Screenshot 300 depicts a static snapshot of thumbnails 310 based on the position of timeline control 320. In operation, video processing engine 116 may scroll the video starting at the chronological point determined by the position of timeline control 320.

FIG. 4 is a screenshot 400 depicting the grid of video thumbnails scanned to subsequent frames by operation of the timeline control slider, according to one embodiment of the present invention. Screenshot 400 may be captured from display device 170. As shown, screenshot 400 includes a grid of video thumbnail segments 410(0) through 410(19).

The grid of video thumbnail segments 410 shown illustrates the example of a video that includes one thousand frames, similar to that shown in FIG. 3. Video thumbnail segment 410(0) depicts the display of frame twelve, which is the twelfth frame of the first segment, where the first segment includes frames one through forty. Video thumbnail segment 410(1) depicts the display of frame fifty-two, which is the twelfth frame of the second segment, where the second segment includes frames forty-one through eighty. Successive video thumbnail segments follow, displaying successive groups of frames until video thumbnail segment 410(19) depicts frame nine hundred seventy two, which is the twelfth frame of the twenty-fifth and final segment, where the final segment includes frames nine hundred sixty one through one thousand.

Screenshot 400 further includes a timeline control 420. The end-user moves timeline control 420 to a position, shown in the example as left of center, so that each thumbnail 410 scans to a further time stamp within the unique segment associated with the segment. As illustrated, each segment then displays the twelfth frame of each unique segment content. FIG. 4 then illustrates a scenario in which video processing engine 116 has scanned to a point chronologically further into the video but has not yet identified the target scene. Further scanning is needed to locate the target.

FIG. 5 is a screenshot 500 depicting the selection of a target scene in a grid of video thumbnails scanned to subsequent frames, according to one embodiment of the present invention. Screenshot 500 may be captured from display device 170. As shown, screenshot 500 includes the grid of video thumbnail segments 510(0) through 510(19).

The grid of video thumbnail segments 510 shown illustrates the example of a video that includes one thousand frames, similar to that shown in FIGS. 3 and 4. Video thumbnail segment 510(0) depicts the display of frame thirty, which is the thirtieth frame of the first segment, where the first segment includes frames one through forty. Video thumbnail segment 510(1) depicts the display of frame seventy, which is the seventieth frame of the second segment, where the second segment includes frames forty-one through eighty. Successive video thumbnail segments follow displaying successive groups of frames until video thumbnail segment 510(19) depicts frame nine hundred ninety, which is the nine hundred and ninetieth frame of the twenty-fifth and final segment, where the final segment includes frames nine hundred sixty one through one thousand.

Screenshot 500 further includes a timeline control 520. The end-user moves timeline control 520 to a position, shown in the example as right of center, so that each thumbnail scans to a further time stamp within the unique segment associated with the segment. As illustrated, each segment then displays the thirtieth frame of each unique segment content.

As screenshot 500 further illustrates, the end-user moves a curser 530 and selects video thumbnail segment 510(17). Selecting segment 510(17) causes the display to revert to the full screen view, as described above in conjunction with FIG. 2, where video processing engine 116 displays the scene illustrated in video thumbnail segment 510(17) in full-screen mode via display device 170 or other elements included in I/O devices 114.

Figure 6:
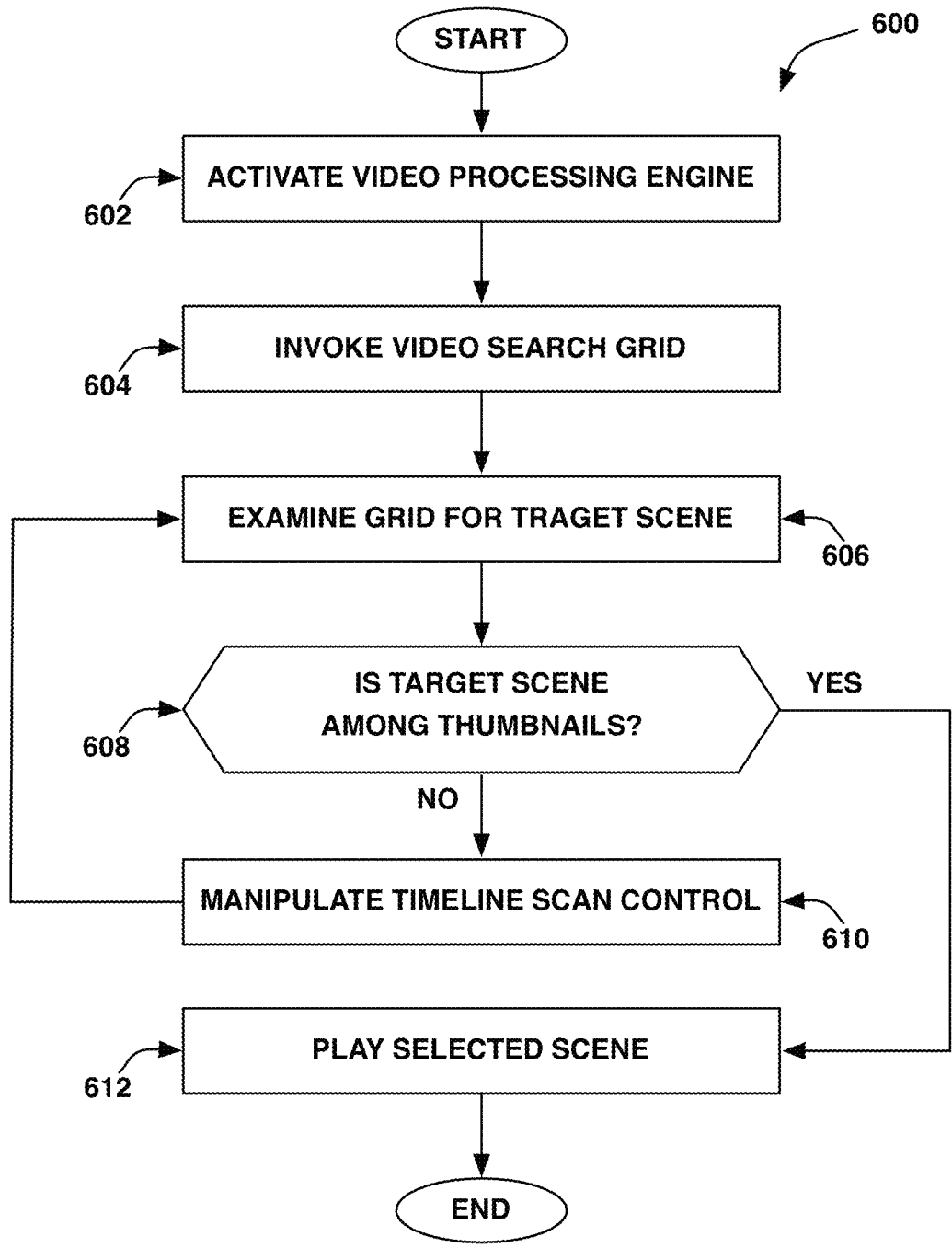
FIG. 6 is a flow diagram of method steps for configuring a video processing engine to search through a video to find a desired scene, according to one embodiment of the present invention.

FIG. 6 is a flow diagram of method steps for configuring a video processing engine 116 to search through a video to find a desired scene, according to one embodiment of the present invention. Although the method steps are described in conjunction with the system of FIG. 1, persons skilled in the art will understand that any system configured to perform the method steps, in any order, is within the scope of the present invention.

As shown, a method 600 begins at step 602, where video processing engine 116, when invoked by processing unit 112, initiates the search for a target scene by accessing a specific video. The specific video may reside locally in local video storage 118 or may reside remotely within video source files 160. At step 604, video processing engine 116 invokes the video search grid array as illustrated above in conjunction with FIG. 3. At step 606, video processing engine 116 examines the selected video via end-user manipulation of the timeline control 420 to scrub through the multiple scenes as illustrated above in conjunction with FIG. 4.

At step 608, video processing engine 116 determines whether the desired target scene is among the video thumbnails included in the grid of video thumbnails. If video processing engine 116 determines that the desired target scene is not included in the grid of video thumbnails, then method 600 proceeds to step 610. At step 610, video processing engine 116 responds to timeline control 420 input by simultaneously scanning through each unique scene of each video thumbnail 410, as illustrated above in conjunction with FIG. 4. The method 600 then returns to step 606.

If, at step 608, video processing engine 116 determines that the desired target scene is among the video thumbnails displayed, then method 600 proceeds to step 612 where video processing engine 116 displays the selected target scene in full-screen mode via display device 170 or other elements included in I/O devices 114, as described above in conjunction with FIG. 2. The method then ends. By implementing the approach described above, video processing engines 116 allows an end-user to quickly and efficiently scrub a video in order to locate a desired target scene.

Techniques for Preparing Video Thumbnails

Figure 7:
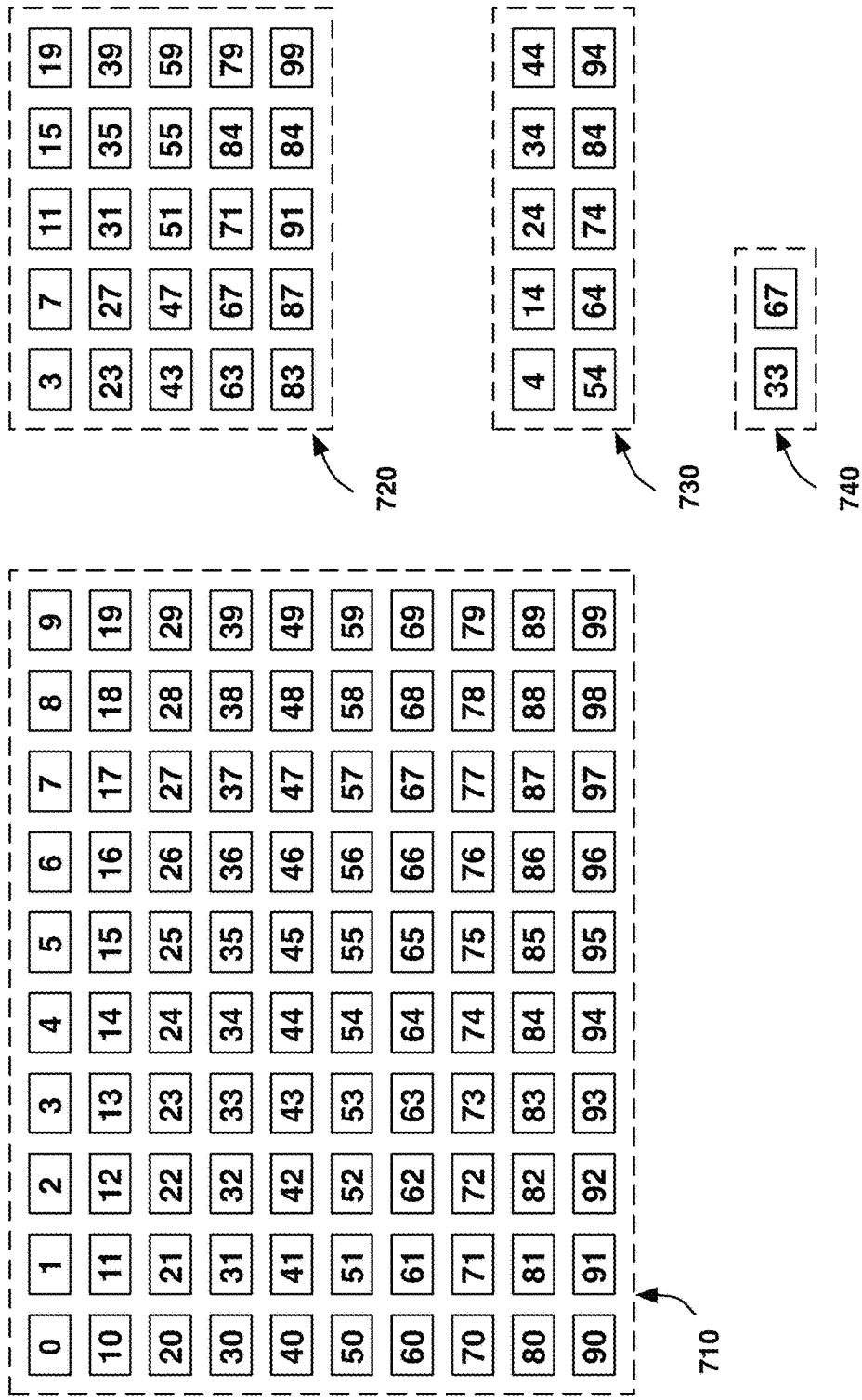
FIG. 7 is a conceptual diagram showing various thumbnail densities, according to one embodiment of the present invention.

FIG. 7 is a conceptual diagram showing various thumbnail densities, according to one embodiment of the present invention. As described above in conjunction with FIGS. 3 through 5, thumbnail segments 310, 410, and 510 each include a complement of frames of the subject video. Thumbnail segments 310, 410, and 510 may include all sequential frames of each segment, so that the end-user may scrub through the multiple scenes and view all possible frames. Alternatively, thumbnail segments 310, 410, and 510 may instead include a reduced number of the total frames within each segment. In this manner, video processing engine 116 may afford more efficient streaming operation while still providing the end-user an effective scrubbing tool.

As shown, a thumbnail complement 710 illustrates an example of a typical thumbnail segment composed of 100 frames where thumbnail complement 710 includes all of those 100 frames. Thumbnail complement 710 then may be considered to include a thumbnail density of 100 percent. Thumbnail segments 310, 410, and 510 may be configured with a 100 percent thumbnail density.

A thumbnail complement 720 illustrates another example of a typical thumbnail segment composed of 100 frames where thumbnail complement 720 only includes every fourth frame. Thumbnail complement 720 then may be considered to include a thumbnail density of 25 percent. Thumbnail segments 310, 410, and 510 may be configured with a 25 percent thumbnail density.

A thumbnail complement 730 illustrates an example of the same typical thumbnail segment 310 composed of 100 frames where thumbnail complement 730 only includes every tenth frame. Thumbnail complement 730 then may be considered to include a thumbnail density of 10 percent. Thumbnail segments 310, 410, and 510 may be configured with a 10 percent thumbnail density.

A thumbnail complement 740 illustrates an example of the same typical thumbnail segment 310 composed of 100 frames where thumbnail complement 740 includes only two frames. Thumbnail complement 740 then may be considered to include a thumbnail density of 2 percent. Thumbnail segments 310, 410, and 510 may be configured with a 2 percent thumbnail density.

Although FIG. 7 depicts exemplary scenes with specific frame densities and specific first frames within each thumbnail 310, persons skilled in the art will understand that a scene composed of any number of frames with any density reduction and any starting scene, is within the scope of the present invention.

Figure 8:
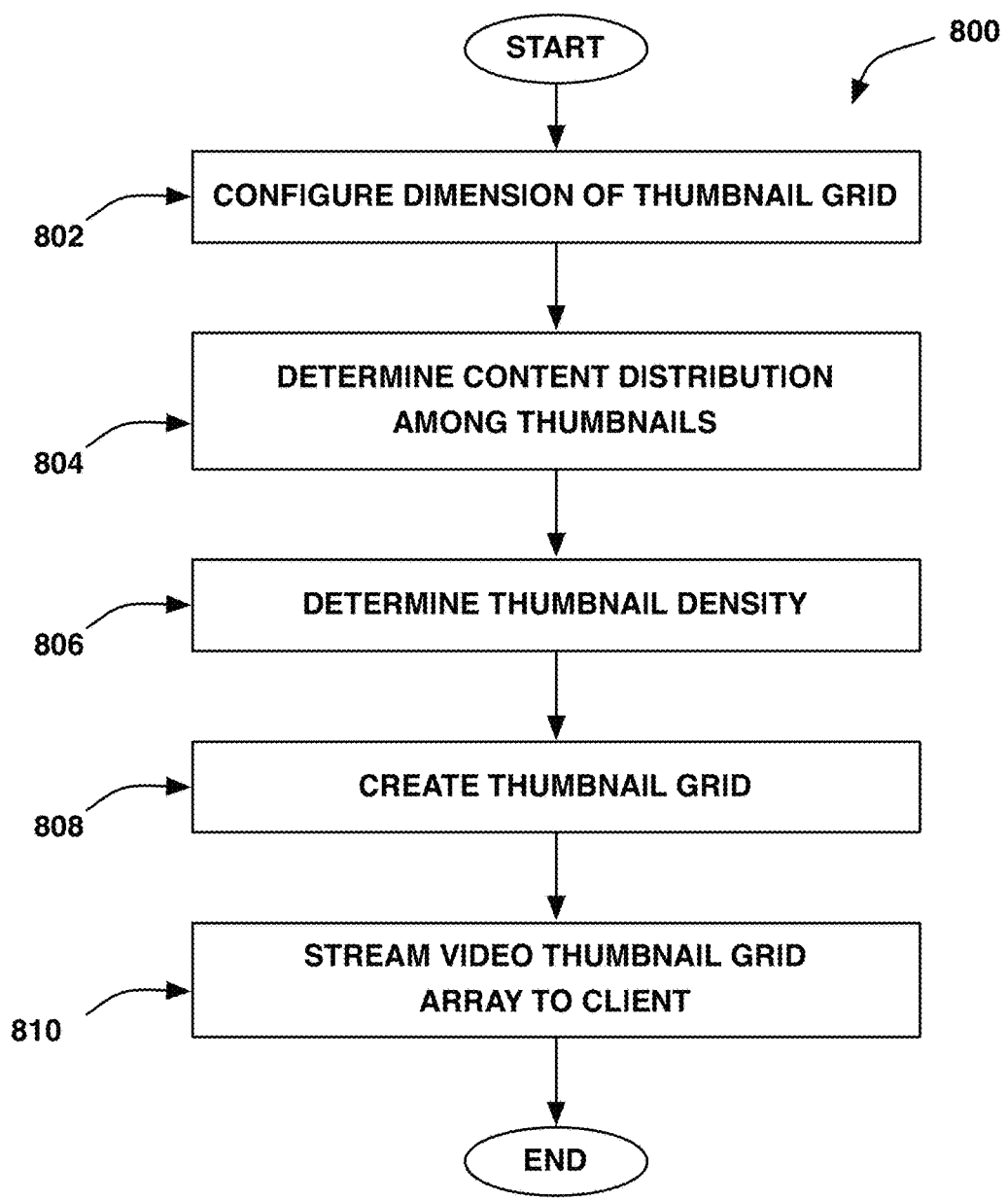
FIG. 8 is a flow diagram of method steps for preparation of video thumbnails, according to one embodiment of the present invention.

FIG. 8 is a flow diagram of method steps for preparation of video thumbnails, according to one embodiment of the present invention. Although the method steps are described in conjunction with the system of FIG. 1, persons skilled in the art will understand that any system configured to perform the method steps, in any order, is within the scope of the present invention.

As shown, a method 800 begins at step 802, where video formatting engine 128, when invoked by processing unit 122, configures the dimension of the thumbnail grid array, as described in detail above in conjunction with FIGS. 3 through 5. At step 804, video formatting engine 128 determines the distribution among the video thumbnail grid array 300 of the content of the video that the end-user specifies from among video source files 160. One example of a distribution may be to assign an equal number of frames to each video thumbnail 310, as illustrated above in conjunction with FIG. 3. Another example of a distribution may be to assign preexisting chapters within the video to each video thumbnail 310. Persons skilled in the art will understand that any distribution of frames, sequentially assigned to successive video thumbnails 310, is within the scope of the present invention.

At 806, video formatting engine 128 determines the thumbnail density as described above in conjunction with FIG. 7. At 808, video formatting engine 128 creates the video thumbnail grid array. At 810, video formatting engine 128 streams the thumbnail grid array to video processing engine 116 via network 140. The method then ends.

In sum, a video processing engine is configured to generate a graphical user interface (GUI) that allows an end-user of the video processing engine to select a specific video and search through the specific video to detect a desired target scene. The video processing engine provides a grid array of video thumbnails that are configured to each display a segment of the video so that multiple scenes may be visually scanned simultaneously. When the end-user identifies a scene within a video thumbnail that may be the desired target scene, the end-user may launch the content of the video thumbnail in full-screen mode to verify that the scene is in fact the desired target scene.

Advantageously, multiple thumbnail videos are displayed simultaneously thereby allowing the end-user to scrub through multiple scenes to more readily identify a desired target scene. Further, each thumbnail includes a reduced number of frames, that is, a reduced frame density, allowing the viewer to more efficiently view the essential content of a scene while minimizing the time required to stream the content. The ability to rapidly select a target scene from among multiple thumbnails affords scrubbing in a manner that is efficient in the time and effort required.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer-implemented method for identifying a target scene within a video file, the method comprising:
  receiving a first set of frames that are associated with a first portion of the video file, wherein the first portion includes the first set of frames, and the first set of frames is a subset of all of the frames included in the first portion;
  receiving a second set of frames that are associated with a second portion of the video file, wherein the second portion includes the second set of frames, and the second set of frames is a subset of all of the frames included in the second portion;
  generating a graphical user interface (GUI) that displays a timeline control and a thumbnail array, the thumbnail array comprising a first thumbnail at a first location in the thumbnail array and a second thumbnail at a second location in the thumbnail array;

causing the GUI to display a first frame included in the first set of frames in the first thumbnail and a second frame included in the second set of frames in the second thumbnail when the timeline control resides at a first position; and causing the GUI to display a third frame included in the first set of frames in the first thumbnail and a fourth frame included in the second set of frames in the second thumbnail when the timeline control resides at a second position, wherein a first number of frames between the first frame and the third frame in the first set of frames equals a second number of frames between the second frame and the fourth frame in the second set of frames, and wherein the first thumbnail remains at the first location in the thumbnail array and the second thumbnail remains at the second location in the thumbnail array when the timeline control resides at the second position.

2. The computer-implemented method of claim 1, further comprising:
identifying a total number of frames to include in the first set of frames based on a first selection criterion; and
identifying a second total number of frames to include in the second set of frames based on a second selection criterion.

3. The computer-implemented method of claim 1, wherein the first frame in the first set of frames occurs chronologically before the third frame in the first set of frames.

4. The computer-implemented method of claim 1, wherein the second frame in the second set of frames occurs chronologically before the fourth frame in the second set of frames.

5. The computer-implemented method of claim 1, further comprising causing the GUI to display frames included in the first set of frames and frames included in the second set of frames based on a chronological ordering of frames in the video file.

6. The computer-implemented method of claim 5, further comprising:
causing the GUI to display frames at a first chronological location within the first portion of the video file based on a third position of the timeline control; and
causing the GUI to display frames at a second chronological location within the second portion of the video file based on the third position of the timeline control.

7. The computer-implemented method of claim 1, further comprising:
identifying that one of the first portion of the video file or the second portion of the video file is the target scene; and
causing the GUI to display one of the first portion of the video file or the second portion of the video file.

8. One or more non-transitory computer-readable media storing program instructions that, when executed by one or more processors, cause the one or more processors to facilitate identifying a target scene within a video file by performing the steps of:
receiving a first set of frames that are associated with a first portion of the video file, wherein the first portion includes the first set of frames, and the first set of frames is a subset of all of the frames included in the first portion;
receiving a second set of frames that are associated with a second portion of the video file, wherein the second portion includes the second set of frames, and the second set of frames is a subset of all of the frames included in the second portion;

generating a graphical user interface (GUI) that displays a timeline control and a thumbnail array, the thumbnail array comprising a first thumbnail at a first location in the thumbnail array and a second thumbnail at a second location in the thumbnail array;

causing the GUI to display a first frame included in the first set of frames in the first thumbnail and a second frame included in the second set of frames in the second thumbnail when the timeline control resides at a first position; and causing the GUI to display a third frame included in the first set of frames in the first thumbnail and a fourth frame included in the second set of frames in the second thumbnail when the timeline control resides at a second position, wherein a first number of frames between the first frame and the third frame in the first set of frames equals a second number of frames between the second frame and the fourth frame in the second set of frames, and wherein the first thumbnail remains at the first location in the thumbnail array and the second thumbnail remains at the second location in the thumbnail array when the timeline control resides at the second position.

9. The one or more non-transitory computer-readable media of claim 8, further comprising:
identifying a total number of frames to include in the first set of frames based on a first selection criterion; and
identifying a second total number of frames to include in the second set of frames based on a second selection criterion.

10. The one or more non-transitory computer-readable media of claim 8, wherein the first frame in the first set of frames occurs chronologically before the third frame in the first set of frames.

11. The one or more non-transitory computer-readable media of claim 8, wherein the second frame in the second set of frames occurs chronologically before the fourth frame in the second set of frames.

12. The one or more non-transitory computer-readable media of claim 8, further comprising causing the GUI to display frames included in the first set of frames and frames included in the second set of frames based on a chronological ordering of frames in the video file.

13. The one or more non-transitory computer-readable media of claim 8, further comprising:
causing the GUI to display frames at a first chronological location within the first portion of the video file based on a third position of the timeline control; and
causing the GUI to display frames at a second chronological location within the second portion of the video file based on the third position of the timeline control.

14. A system configured to facilitate identifying a target scene within a video file, the system comprising:
a display device configured to display a graphical user interface (GUI);
a memory unit;
a processor coupled to the memory unit and configured to:
receive a first set of frames that reflect a first portion of the video file, wherein the first portion includes the first set of frames, and the first set of frames is a subset of all of the frames included in the first portion,
receive a second set of frames that reflect a second portion of the video file, wherein the second portion includes the second set of frames, and the second set of frames is a subset of all of the frames included in the second portion,
generate a GUI that displays a timeline control and a thumbnail array, the thumbnail array comprising a first thumbnail at a first location in the thumbnail array and a second thumbnail at a second location in the thumbnail array, and
cause the GUI to display a first frame included in the first set of frames in the first thumbnail and a second frame included in the second set of frames in the second thumbnail when the timeline control resides at a first position; and
cause the GUI to display a third frame included in the first set of frames in the first thumbnail and a fourth frame included in the second set of frames in the second thumbnail when the timeline control resides at a second position, wherein a first number of frames between the first frame and the third frame in the first set of frames equals a second number of frames between the second frame and the fourth frame in the second set of frames, and wherein the first thumbnail remains at the first location in the thumbnail array and the second thumbnail remains at the second location in the thumbnail array when the timeline control resides at the second position.

15. The system of claim 14, wherein the memory unit stores program instructions that, when executed by the processor, cause the processor to:
identify a total number of frames to include in the first set of frames based on a first selection criterion; and
identify a second total number of frames to include in the second set of frames based on a second selection criterion.

16. The system of claim 14, wherein the processor is further configured to:
identify that one of the first portion of the video file or the second portion of the video file is the target scene; and
cause the GUI to display one of the first portion of the video file or the second portion of the video file.

* * * * *